United States Patent
Yang

(10) Patent No.: US 11,895,574 B2
(45) Date of Patent: Feb. 6, 2024

(54) METHODS FOR RECEIVING AND SENDING SYSTEM INFORMATION, TERMINAL AND DEVICES

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 472 days.

(21) Appl. No.: 17/272,818

(22) PCT Filed: Sep. 6, 2018

(86) PCT No.: PCT/CN2018/104433
§ 371 (c)(1),
(2) Date: Mar. 2, 2021

(87) PCT Pub. No.: WO2020/047808
PCT Pub. Date: Mar. 12, 2020

(65) Prior Publication Data
US 2021/0360514 A1    Nov. 18, 2021

(51) Int. Cl.
*H04W 48/14* (2009.01)
*H04W 48/10* (2009.01)
*H04W 74/08* (2009.01)

(52) U.S. Cl.
CPC ........... *H04W 48/14* (2013.01); *H04W 48/10* (2013.01); *H04W 74/0833* (2013.01)

(58) Field of Classification Search
None
See application file for complete search history.

(56) References Cited

U.S. PATENT DOCUMENTS

| 2019/0261234 A1* | 8/2019 | Park | H04W 36/0069 |
| 2019/0274096 A1* | 9/2019 | Ingale | H04W 48/12 |

FOREIGN PATENT DOCUMENTS

| AU | 2017227408 A1 | | 7/2018 | |
| CA | 2 685 687 C | | 10/2017 | |
| CN | 103733691 A | * | 4/2014 | H04W 48/16 |
| CN | 103856923 A | | 6/2014 | |

(Continued)

OTHER PUBLICATIONS

International Search Report dated Apr. 28, 2019 in PCT/CN2018/104433 filed Sep. 6, 2018, 2 pages.

(Continued)

*Primary Examiner* — Adolf Dsouza
(74) *Attorney, Agent, or Firm* — Oblon, McClelland, Maier & Neustadt, L.L.P.

(57) ABSTRACT

A method for receiving system information that is applied to a terminal includes: sending a system information request message to a first access network device, the system information request message carrying an identification of a neighbor cell and an identification of a system information block (SIB) X, where X is an integer greater than 1; and receiving other system information (Other SI) broadcasted by a second access network device. The Other SI carries the SIB X. The first access network device is an access network device for a cell where the terminal currently dwells, and the second access network device is an access network device for the neighbor cell.

17 Claims, 6 Drawing Sheets

(56) References Cited

FOREIGN PATENT DOCUMENTS

CN 110463275 B * 10/2021 ............ H04W 48/10

OTHER PUBLICATIONS

Indian Office Action dated Mar. 2, 2022 in Indian Patent Application No. 202147012843, 6 pages.
Extended European Search Report dated Mar. 17, 2022 in European Patent Application No. 18932621.8, 16 pages.
"Discussion on Issues of Other SIs" OPPO, 3GPP TSG-RAN2 Meeting #96, R2-167480, Nov. 14-18, 2016, 4 pages.

* cited by examiner

METHODS FOR RECEIVING AND SENDING SYSTEM INFORMATION, TERMINAL AND DEVICES

CROSS-REFERENCE TO RELATED APPLICATION

This application is a U.S. national phase of International Application No. PCT/CN2018/104433, filed on Sep. 6, 2018, the entire content of which is incorporated herein by reference.

TECHNICAL FIELD

The present disclosure relates to the field of communication, including to methods for sending and receiving system information, a terminal, and devices.

BACKGROUND

In long-term evolution (LTE), in order to support vehicle to everything (V2X) services, a radio resource configuration method based on a resource pool is introduced. The resource pool is divided into a sending resource pool and a receiving resource pool. The sending resource pool and the receiving resource pool indicate the time and frequency ranges of the radio resources used for sending and receiving the V2X service respectively.

An evolved node base station (eNode B, eNB) can broadcast V2X resource configuration of a cell in the cell broadcast information. The eNB broadcasts the system information block (SIB) 21 to each user equipment (UE) in the cell, and the UE reads the resource configuration information from the SIB 21. The resource configuration information is used for configuring resource pool configuration of V2X Data. In order to meet the low latency requirements of V2X services, when idle UE needs to perform cell reselection (handover from a dwell cell to a reselected cell), the UE can read the SIB 21 of a target cell in advance, and obtain resource pool configuration of the V2X service of the target cell from the SIB 21. After the UE reselects the cell, the UE uses the resource pool configuration read in advance to send and receive the V2X service, thereby saving the delay possibly caused when the UE reads the SIB 21 after the cell reselection.

In the 5G New Radio (NR) system, the system information is divided into minimum system information (minimum SI) and other system information (Other SI). The base station may broadcast the minimum SI all the time, and selectively broadcast Other SI according to a request of the UE. The SIB used to carry resource configuration information in 5G belongs to Other SI, and at this time, the UE cannot read the resource pool configuration of the V2X service of the target cell before cell reselection, therefore, the low latency requirement of the V2X service cannot be met.

SUMMARY

The present disclosure provides methods for sending and receiving system information, a terminal and devices.

According to a first aspect of the disclosure, there is provided a method for receiving system information, applied to a terminal and including: sending a system information request message to a first access network device, in which the system information request message carries an identification of a neighbor cell and an identification of a system information block (SIB) X, where X is an integer greater than 1. The method can further include receiving other system information (Other SI) broadcasted by a second access network device, in which, the Other SI carries the SIB X. The first access network device is an access network device for a cell where the terminal currently dwells, and the second access network device is an access network device for the neighbor cell.

According to another aspect the disclosure, there is provided a method for sending system information that can be applied to a first access network device. The method can include receiving a system information request message sent by a terminal, in which the system information request message carries an identification of a neighbor cell and an identification of a system information block (SIB) X, where X is an integer greater than 1. The method can further include sending an update message to a second access network device, in which the update message carries the identification of the SIB X, the update message is configured to instruct the second access network device to broadcast other system information (Other SI) carrying the SIB X. The first access network device is an access network device for a cell where the terminal currently dwells, and the second access network device is an access network device for the neighbor cell.

According to another aspect of the disclosure, there is provided a method for sending system information that can be applied to a second access network device. The method can include receiving an update message sent by a first access network device, in which the update message carries an identification of a system information block (SIB) X, X is an integer greater than 1, the update message is sent by the first access network device after receiving a system information request message sent by a terminal. The method can further include broadcasting other system information (Other SI) carrying the SIB X. The first access network device is an access network device for a cell where the terminal currently dwells, and the second access network device is an access network device for a neighbor cell of the cell where the terminal currently dwells.

According to another aspect of the disclosure, there is provided a terminal, including a processor, a transceiver connected to the processor, and a memory for storing instructions executable by the processor. The processor can be configured to implement the method for receiving system information applied to the terminal according to the above embodiment of the present disclosure.

According to another aspect of the disclosure, there is provided a first access network device, including a processor, a transmitter and a receiver connected to the processor, and a memory for storing instructions executable by the processor. The processor can be configured to implement the method for sending system information applied to the first access network device according to the above embodiment of the present disclosure.

According to another aspect of the disclosure, there is provided a second access network device, including a processor, a transmitter and a receiver connected to the processor, and a memory for storing instructions executable by the processor. The processor is configured to implement the method for sending system information applied to the second access network device according to the above embodiment of the present disclosure It is to be understood that both the foregoing general description and the following detailed description are exemplary and explanatory only, and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

In the 5G New Radio (NR) technologies, system information is divided into minimum system information (minimum SI) and other system information (Other SI). The minimum SI includes a master information block (MIB) and a system information block (SIB), and a base station may broadcast the minimum SI all the time. The Other SI includes all other remaining SIBs, and the base station may selectively broadcast one or more SIBs in the Other SI based on a request of user equipment (UE), that is, the base station may start broadcasting the corresponding SIB only after the UE sends an Other SI request. There are two ways to request the Other SI.

The first way is a request way based on the message 1 (msg1) in the random access procedure. That is, the base station may broadcast a correspondence relationship between a random access preamble and the Other SI, and as long as the UE sends a random access preamble corresponding to an SIB to be requested in the msg 1 of the random access process, the base station may learn the SIB to be requested by the UE. The second way is a request way based on a message 3 (msg3) in the random access process. That is, the UE may send a system information request message to the base station in the message 3, which clearly indicates the SIB to be requested by the UE.

Figure 1:
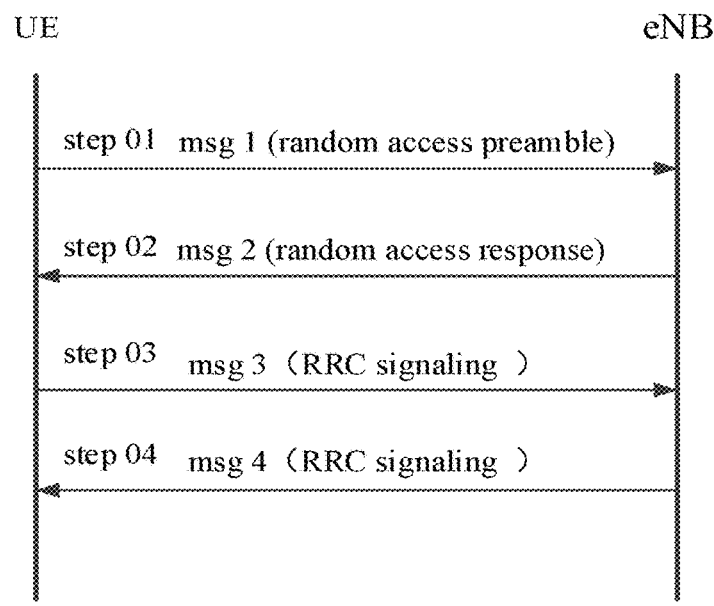
FIG. 1 is a schematic diagram illustrating signaling interaction of a competition-based random access procedure in long-term evolution (LTE).

For example, FIG. 1 illustrates a schematic diagram illustrating signaling interaction of a competition-based random access procedure in long-term evolution (LTE). The procedure can include the following steps.

At step 01, UE randomly selects a preamble sequence, and sends a msg 1 to an evolved node base station (eNB) on a random access channel (RACH), so that the eNB is able to estimate transmission delay between the eNB and the UE.

At step 02, the eNB sends a message 2 (msg 2) through a downlink to the UE after detecting that the preamble sequence is sent. The msg 2 includes a random access response. The random access response contains at least the following information, such as serial number of the received preamble sequence, timing adjustment information, location indication information of uplink resource allocated for the UE, and a cell radio network temporary identification (C-RNTI) temporarily allocated.

At step 03, after receiving the random access response, the UE sends a message 3 (msg 3) on the allocated uplink resource according to instruction of the random access response.

At step 04, the eNB receives the msg 3 from the UE, and returns a conflict resolution message 4 (msg 4) to the successfully accessed UE.

In order to support a UE in an idle state to perform a service with low latency requirements, such as a vehicle to everything (V2X) service and Internet of things (IoT), 5G technology may introduce a new SIB X in the Other SI, and the SIB X is configured to carry radio resource configuration required for sending and receiving the V2X service. When a neighbor cell in cell reselection does not broadcast the SIB X, the UE cannot request a base station for the neighbor cell to broadcast the SIB X before the cell reselection, and may send a system information request message only after the cell reselection is completed. As a result, the UE cannot transmit the V2X service during a time period from the completion of the cell reselection to successful reception of the SIB X, which causes a large delay and a failure to meet the low latency requirement of certain services. For example, the service is a V2X service.

The embodiments of the present disclosure may solve a problem that the UE cannot request the neighbor cell to broadcast the SIB X before the cell reselection, and can only send the system information request message to obtain the SIB X after the cell reselection is completed, resulting in a problem of unable to meet the low latency requirement of certain services.

In an embodiment of the present disclosure, before the cell reselection, a terminal may obtain the SIB X of the neighbor cell in advance. The terminal may send a request to a second base station through a first base station or an access and mobility management function (AMF). The second base station broadcasts the SIB X based on the request, so that the terminal may receive the SIB X broadcasted by the second base station in advance. After the terminal completes the reselection, a resource pool of a new cell may be used for performing V2X service immediately. Following are two schematic diagrams of a mobile communication system provided in two exemplary embodiments of the present disclosure.

Figure 2:
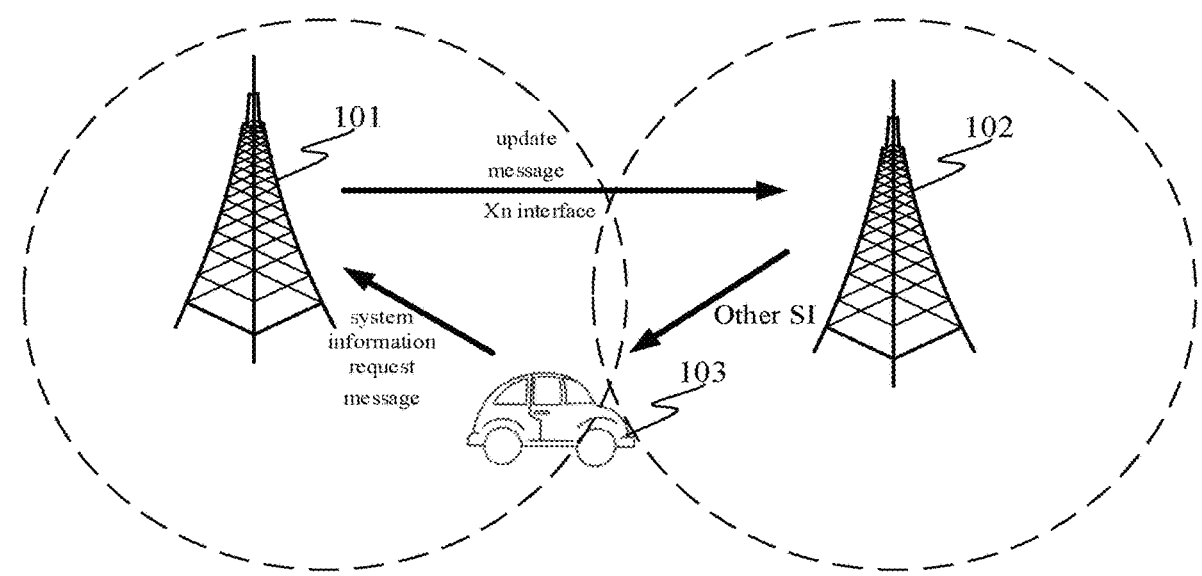
FIG. 2 is a schematic diagram illustrating a mobile communication system according to an exemplary embodiment of the present disclosure.

FIG. 2 illustrates a schematic diagram of a mobile communication system according to an exemplary embodiment of the present disclosure. FIG. 2 includes a first access network device 101, a second access network device 102, and a terminal 103.

The first access network device 101 may be a serving base station for a cell where the terminal currently dwells. The second access network device 102 may be a base station for a neighbor cell. The terminal 103 moves in a direction from the dwell cell to the neighbor cell. For example, a vehicle-mounted device travels in a direction from the dwell cell to the neighbor cell. The first access network device 101 is configured to receive a system information request message sent by the terminal 103, and send an update message to the second access network device 102 based on the system information request message. The second access network device 102 is configured to receive the update message sent by the first access network device 101, and broadcast Other SI carrying a SIB X based on the update message. The terminal 103 is configured to send the system information request message to the first access network device 101, and receive the Other SI carrying the SIB X after the second access network device 102 broadcasts the Other SI.

Figure 3:
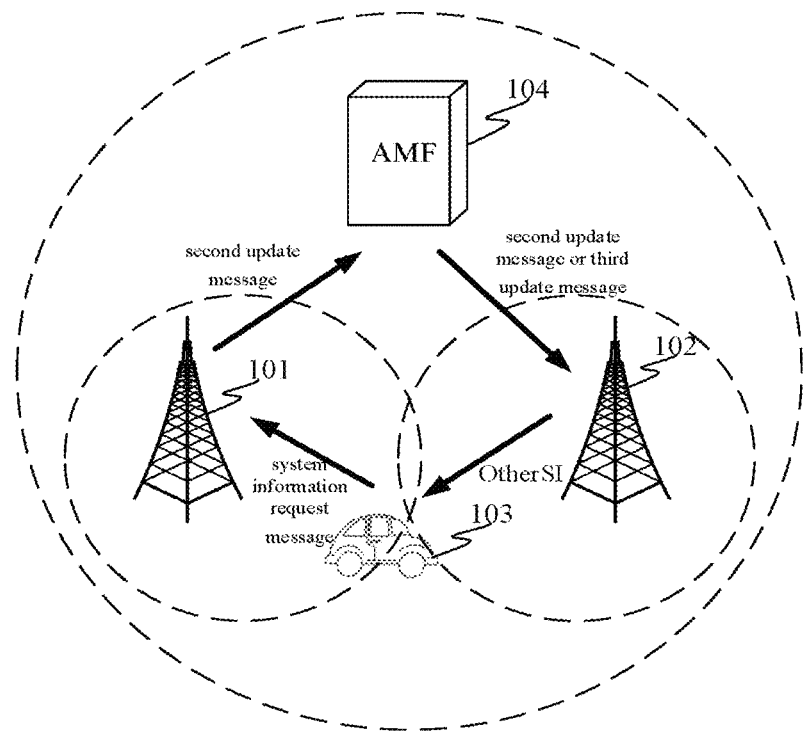
FIG. 3 is a schematic diagram illustrating a mobile communication system according to another exemplary embodiment of the present disclosure.

FIG. 3 illustrates a schematic diagram of a mobile communication system according to another exemplary embodiment of the present disclosure. FIG. 3 includes a first access network device 101, a second access network device 102, a terminal 103, and AMF 104. The first access network device 101 may be a serving base station for a cell where the terminal currently dwells. The second access network device 102 may be a base station for a neighbor cell. The terminal 103 moves in a direction from the dwell cell to the neighbor cell. For example, a vehicle-mounted device travels in a direction from the dwell cell to the neighbor cell.

The AMF 104 is a management element of the first access network device 101 and a second access network device 102 in a core network. The first access network device 101 is configured to receive a system information request message sent by the terminal 103, and send a second update message to the AMF 104 based on the system information request message. The AMF 104 is configured to receive the second update message sent by the first access network device 101 and forward the second update message to the second access network device 102 based on the second update message, or send a third update message. The second access network device 102 is configured to receive the second update message forwarded by the AMF 104 or the third update message sent by the AMF 104, and broadcast Other SI carrying a SIB X based on the second update message or the third update message. The terminal 103 is configured to send the system information request message to the first access network device 101, and receive the Other SI carrying the SIB X after the second access network device 102 broadcasts the Other SI.

For example, implementation environment of a method for transmission system information provided in the present disclosure may be any one of the above-mentioned two mobile communication systems, which is not limited in this embodiment. The foregoing implementation environment may be a 5G new radio (NR) system, the terminal 103 is a terminal supporting a 5G NR communication protocol, and the access network device may be a gNB in the 5G NR system. For example, the terminal 103 is a terminal supporting a V2X service.

Figure 4:
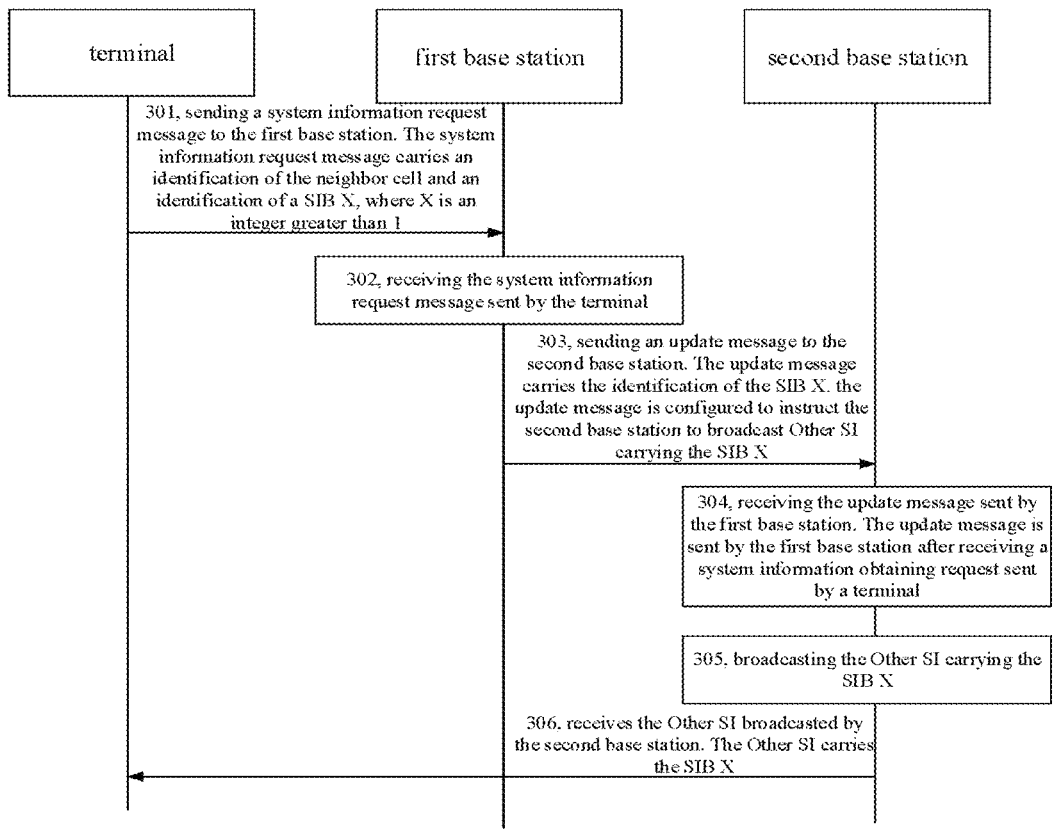
FIG. 4 is a flow chart illustrating a method for transmitting system information according to an exemplary embodiment of the present disclosure.

FIG. 4 illustrates a flow chart of a method for transmitting system information according to an exemplary embodiment of the present disclosure. The method may be applied to the mobile communication system illustrated in FIG. 2 and FIG. 3. For example, in this embodiment, the first access network device is a first base station for a cell where a terminal currently dwells, and the second access network device is a second base station for neighbor cell. The method can include the following steps.

At step 301, a terminal sends a system information request message to the first base station. The system information request message carries an identification of the neighbor cell and an identification of a SIB X, where X is an integer greater than 1. The system information request message is configured to instruct the first base station to send an update message to a second base station. The update message carries the identification of the SIB X. Alternatively, the system information request message is carried in a msg 3 message during a random access procedure.

The SIB X carries radio resource configuration information of a specified service. The specified service is a service with a transmission latency requirement lower than a preset threshold, also called a low-latency service. For example, the specified service is a V2X service, the SIB X carries resource pool configuration information of the V2X service. The resource pool configuration information includes time and frequency ranges of radio resource used to send and/or receive V2X data. The SIB X is a SIB used to indicate a resource pool of the specified service specified by a communication protocol, and a serial number of the SIB X is fixed. That is, each cell uses the SIB X with the same serial number to provide the terminal with the resource pool configuration information of the specified service.

Alternatively, there are one or more identifications of neighbor cells. The identification of the neighbor cell includes a physical cell identifier (PCI), or the identification of the neighbor cell includes an E-UTRAN cell global identification (ECGI).

Alternatively, when a cell broadcasts SIB 1, UE may receive an ECGI of a neighbor cell. When the UE establishes synchronization information with a cell, the UE may receive a PCI of a neighbor cell through the synchronization information.

At step 302, the first base station receives the system information request message sent by the terminal. Alternatively, the first base station receives the msg 3 in the random access procedure sent by the terminal, and obtains the system information request message from the msg 3.

At step 303, the first base station sends an update message to the second base station. The update message carries the identification of the SIB X. the update message is configured to instruct the second base station to broadcast Other SI carrying the SIB X. The Other SI at least includes the SIB X. After the UE request the SIB X, the based station may broadcast the Other SI including the SIB X based on a request of the UE. In addition, the base station may broadcast at least one SIB X of different Other SI according to the request of different UE. A specific form of the SIB X may be determined based on actual situation and is not limited herein.

When there is an Xn interface between the first base station and the second base station, the first base station can send the update message to the second base station through the Xn interface. Further, when there is no Xn interface between the first base station and the second base station, the first base station can send the update message to the second base station through a management element of a core network. The Xn interface can be an interface configured to transmit signaling and/or data between base stations.

At step 304, the second base station receives the update message sent by the first base station. The update message is sent by the first base station after receiving a system information obtaining request sent by a terminal.

When there is an Xn interface between the first base station and the second base station, the second base station can receive the update message sent by the first base station through the Xn interface. Further, when there is no Xn interface between the first base station and the second base station, the second base station can receive the update message forward by the management element of the core network.

At step 305, the second base station broadcasts the Other SI carrying the SIB X.

At step 306, the terminal receives the Other SI broadcasted by the second base station. The Other SI carries the SIB X.

In conclusion, in the method provided by this embodiment, the system information request message is sent to the first access network device for the dwell cell by the UE, the first access network device receives the system information request message and sends the update message to the second access network device for the neighbor cell, the second access network device broadcasts the Other SI of the neighbor cell after receiving the update message, the Other SI carries the SIB X for configuring transmission resources. Thus, it is realized that the UE can read the SIB X of the neighbor cell in advance before performing cell reselection, thereby meeting the low latency requirement of the terminal when transmitting service data.

The above steps performed by the terminal may be individually implemented as a method for receiving system information at a terminal side. The above steps performed by the first base station may be individually implemented as a method for sending system information at a first access network device side. The steps performed by the second base station may be individually implemented as a method for sending system information at a second access network device side.

In some other embodiments of the disclosure, when there is an Xn interface between the first base station and the second base station, the first base station may send a message to the second base station through the Xn interface. The Xn interface is used for a signaling interface for transmitting a data message between base stations.

Figure 5:
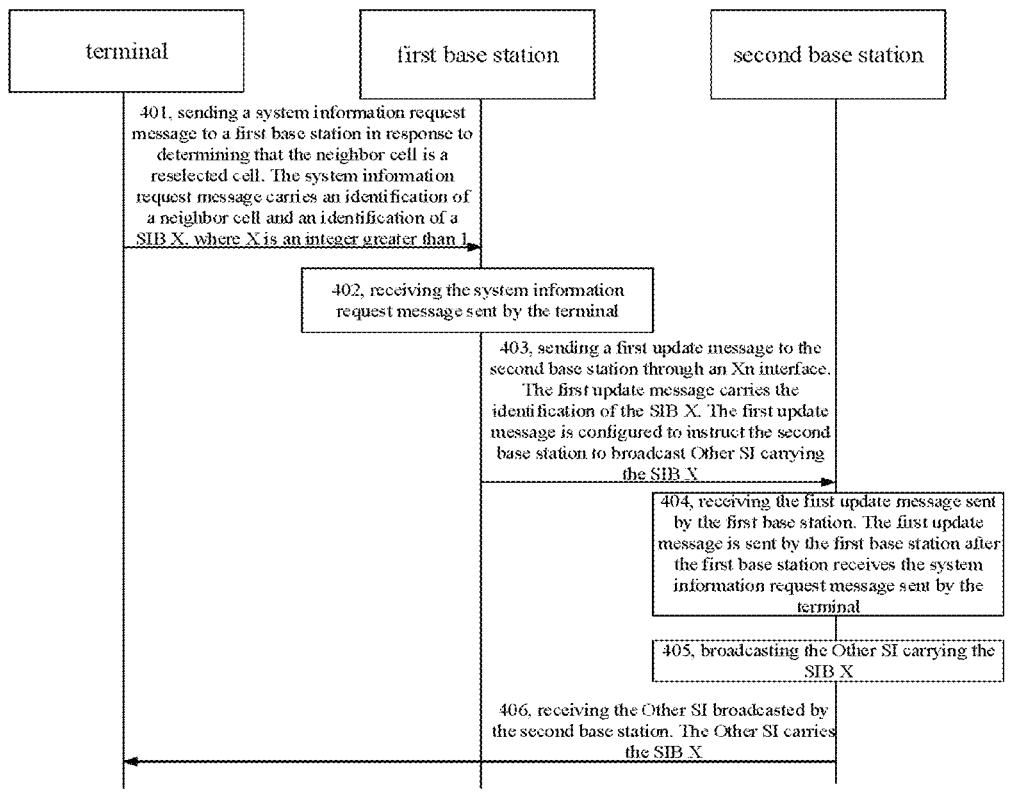
FIG. 5 is a flow chart illustrating a method for transmitting system information according to another exemplary embodiment of the present disclosure.

FIG. 5 illustrates a flow chart of a method for transmitting system information according to another exemplary embodiment of the present disclosure. The method may be applied to the mobile communication system illustrated in FIG. 2. The first access network device may be a serving base station for a cell where the terminal currently dwells. The second access network device may be a base station for a neighbor cell. The method can include the following steps:

At step 401, the terminal sends a system information request message to a first base station in response to determining that the neighbor cell is a reselected cell. The system information request message carries an identification of a neighbor cell and an identification of a system information block (SIB) X, where X is an integer greater than 1. The system information request message is configured to instruct the first base station to send an update message to a second base station. The update message carries the identification of the SIB X. Alternatively, the system information request message is carried in a msg 3 message during a random access procedure.

Alternatively, the terminal sends the system information request message to the first base station before cell reselection is completed. The terminal sends the system information request message to the first base station when the terminal determines that the neighbor cell is a reselected cell (also called a target cell) during the cell reselection process.

Alternatively, the terminal sends the msg 3 in the random access procedure to the first base station. The msg 3 carries the system information request message.

Alternatively, there are one or more identifications of the neighbor cells. The identification of the neighbor cell includes a physical cell identifier (PCI), or the identification of the neighbor cell includes an ECGI.

Alternatively, when a cell broadcasts a SIB 1, UE may receive an ECGI of a neighbor cell through the SIB 1. When the UE establishes synchronization information with a cell, the UE may receive a PCI of a neighbor cell through the synchronization information.

Alternatively, the SIB X carries radio resource configuration information of a specified service. The specified service is a service with a transmission latency requirement lower than a preset threshold, also called a low-latency service. For example, the specified service is a V2X service, the SIB X carries resource pool configuration information of the V2X service. The resource pool configuration information includes time and frequency ranges of radio resource used to send and/or receive V2X data. The SIB X is a SIB used to indicate a resource pool of the specified service specified by a communication protocol, and a serial number of the SIB X is fixed. That is, each cell uses the SIB X with the same serial number to provide the terminal with the resource pool configuration information of the specified service.

At step 402, the first base station receives the system information request message sent by the terminal. Alternatively, the first base station receives the msg 3 in the random access procedure sent by the terminal, and obtains the system information request message from the msg 3.

At step 403, the first base station sends a first update message to the second base station through an Xn interface. The first update message carries the identification of the SIB X. The first update message is configured to instruct the second base station to broadcast Other SI carrying the SIB X. The Other SI at least includes the SIB X. After the UE request the SIB X, the base station may broadcast the Other SI carrying the SIB X based on the request of the UE. In addition, the base station may broadcast at least one SIB X of different Other SI according to the request of different UE. A specific form of the SIB X may be determined based on actual situation and is not limited herein.

The Xn interface is a channel for the first base station to send the first update message to the second base station. The first base station may directly send the first update message to the second base station through the Xn interface, without transiting through other network elements, so as to realize the direct communication between the first base station and the second base station.

Alternatively, the first update message includes a NG-RAN NODE CONFIGURTION UPDATE message.

At step 404, the second base station receives the first update message sent by the first base station. The first update message is sent by the first base station after the first base station receives the system information request message sent by the terminal.

At step 405, the second base station broadcasts the Other SI carrying the SIB X.

At step 406, the terminal receives the Other SI broadcasted by the second base station. The Other SI carries the SIB X.

Alternatively, the terminal obtains radio resource configuration information of a specified service from the SIB X. Alternatively, the terminal obtains resource pool configuration information of a V2X service from the SIB X. The resource pool configuration information includes time and frequency ranges of radio resource used to send and/or receive V2X data. Alternatively, a time point for obtaining the radio resource configuration information of the specified service is earlier than a completion time point of the cell reselection process. That is, the terminal may obtain the radio resource configuration information of the specified service before the completion of the cell reselection.

Alternatively, the terminal sends and/or receives the service data of the specified service based on the radio resource configuration information of the specified service after the completion of the cell reselection.

In conclusion, in the method provided in this embodiment, the system information request message is sent to the first access network device for the dwell cell by the UE, the first access network device receives the system information request message and sends the update message to the second access network device for the neighbor cell, the second access network device broadcasts the Other SI of the neighbor cell after receiving the update message, the Other SI carries the SIB X for configuring transmission resources. Thus, it is realized that the UE can read the SIB X of the neighbor cell in advance before performing cell reselection, thereby meeting the low latency requirement of the terminal when transmitting service data.

In the method provided in this embodiment, there is the Xn interface between the first base station and the second base station, realizing direct communication between the first base station and the second base station. The first base station may directly send the first update message to the second base station through the Xn interface, requesting the neighbor cell to broadcast the Other SI carrying the SIB X, so that the UE may obtain the Other SI carrying the SIB X.

The above steps performed by the terminal may be individually implemented as a method for receiving system information at a terminal side. The above steps performed by the first base station may be individually implemented as a method for sending system information on a first access network device side. The steps performed by the second base station may be individually implemented as a method for sending system information at a second access network device side.

In some other embodiments of the disclosure, when there is no Xn interface between the first base station and the second base station, the first base station may first send a system information request message to a management element. And then, the management element sends a broadcast system information. In 5G NR, the management element may be an AMF.

Figure 6:
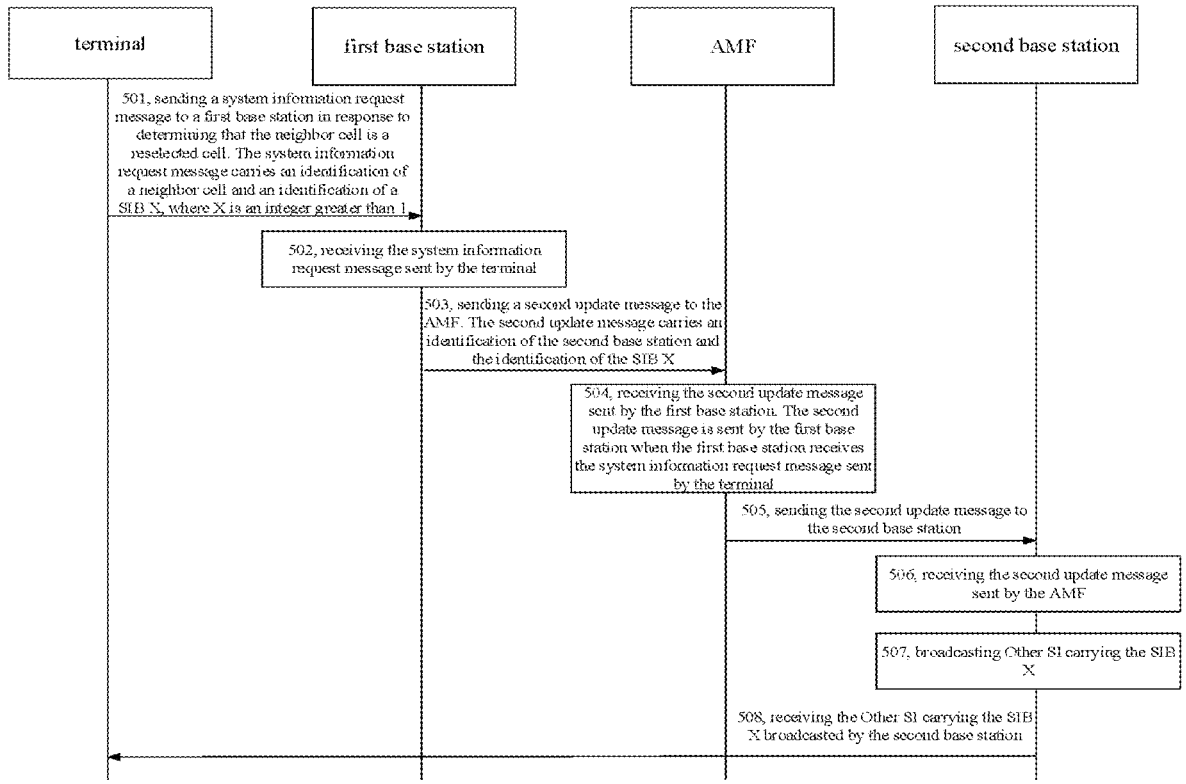
FIG. 6 is a flow chart illustrating a method for transmitting system information according to another exemplary embodiment of the present disclosure.

FIG. 6 illustrates a flow chart of a method for transmitting system information according to another exemplary embodiment of the disclosure. The method may be applied to the mobile communication system illustrated in FIG. 3. The first access network device may be a serving base station for a cell where the terminal currently dwells. The second access network device may be a base station for a neighbor cell. The management element may be an AMF of the first base station and the second base station in a core network. The method can include the following steps.

At step 501, the terminal sends a system information request message to a first base station in response to determining that the neighbor cell is a reselected cell. The system information request message carries an identification of a neighbor cell and an identification of a system information block (SIB) X, where X is an integer greater than 1.

At step 502, the first base station receives the system information request message sent by the terminal. The step for the terminal to send the system information request message to the first base station is the same as step 401, and the step for the first base station to receive the system information request message is the same as step 402, which will not be repeated herein.

At step 503, the first base station sends a second update message to the AMF. The second update message carries an identification of the second base station and the identification of the SIB X. There is no Xn interface between the first base station and the second base station. By using the AMF as a transfer network element, that is, taking the AMF as a transfer station when the first base station sends the update message to the second base station and there is no direct communication channel, it realizes the message transfer between the first base station and the second base station. Alternatively, the second update message includes a RAN CONFIGURATION UPDATE message. Alternatively, the identification of the second base station includes a Global RAN Node ID and a TA ID.

At step 504, the AMF receives the second update message sent by the first base station. The second update message is sent by the first base station when the first base station receives the system information request message sent by the terminal. After receiving the second update message, the AMF addresses the second base station according to the identification of the second base station in the second update message, to identify a neighbor cell of a cell where the second base station locates. The neighbor cell is a reselected cell for the terminal to reselect. The second update message is sent to the second base station based on an addressing result.

At step 505, the AMF sends the second update message to the second base station. The AMF is configured to forward the second update message sent by the first base station to the second base station. The AMF determines a location of the second base station based on the addressing result, and forwards the second update message sent by the first base station to the second base station.

At step 506, the second base station receives the second update message sent by the AMF.

At step 507, the second base station broadcasts Other SI carrying the SIB X. The Other SI at least includes the SIB X. After the UE request the SIB X, the based station may broadcast the Other SI including the SIB X based on a request of the UE. In addition, the base station may broadcast at least one SIB X of different Other SI according to the request of different UE. A specific form of the SIB X may be determined based on actual situation and is not limited herein.

At step 508, the terminal receives the Other SI carrying the SIB X broadcasted by the second base station. The steps for the terminal receiving the Other SI, and obtaining the radio resource configuration information of a specified server according to the SIB X are the same as the step 406, which are not repeated herein.

In conclusion, in the method provided by this embodiment, the system information request message is sent to the first access network device for the dwell cell by the UE, the first access network device receives the system information request message and sends the update message to the second access network device for the neighbor cell, the second access network device broadcasts the Other SI of the neighbor cell after receiving the update message, the Other SI carries the SIB X for configuring transmission resources. Thus, it is realized that the UE can read the SIB X of the neighbor cell in advance before performing cell reselection, thereby meeting the low latency requirement of the terminal when transmitting service data.

In the method provided by this embodiment, when there is no Xn interface between the first base station and the second base station, and there is no direct communication between the first base station and the second base station, the AMF may be used as the transfer network element to realize the message transfer between the first base station and the second base station. The AMF forward the second update message sent from the first base station to the second base station. The second base station broadcasts the Other SI carrying the SIB X based on the second update message, so that the UE may obtain the Other SI carrying the SIB X.

The above steps performed by the terminal may be individually implemented as a method for receiving system information at a terminal side. The above steps performed by the first base station may be individually implemented as a method for sending system information on a first access network device side. The steps performed by the second base station may be individually implemented as a method for sending system information at a second access network device side. The steps performed by the AMF may be individually implemented as a method for sending system information at a management element side.

Figure 7:
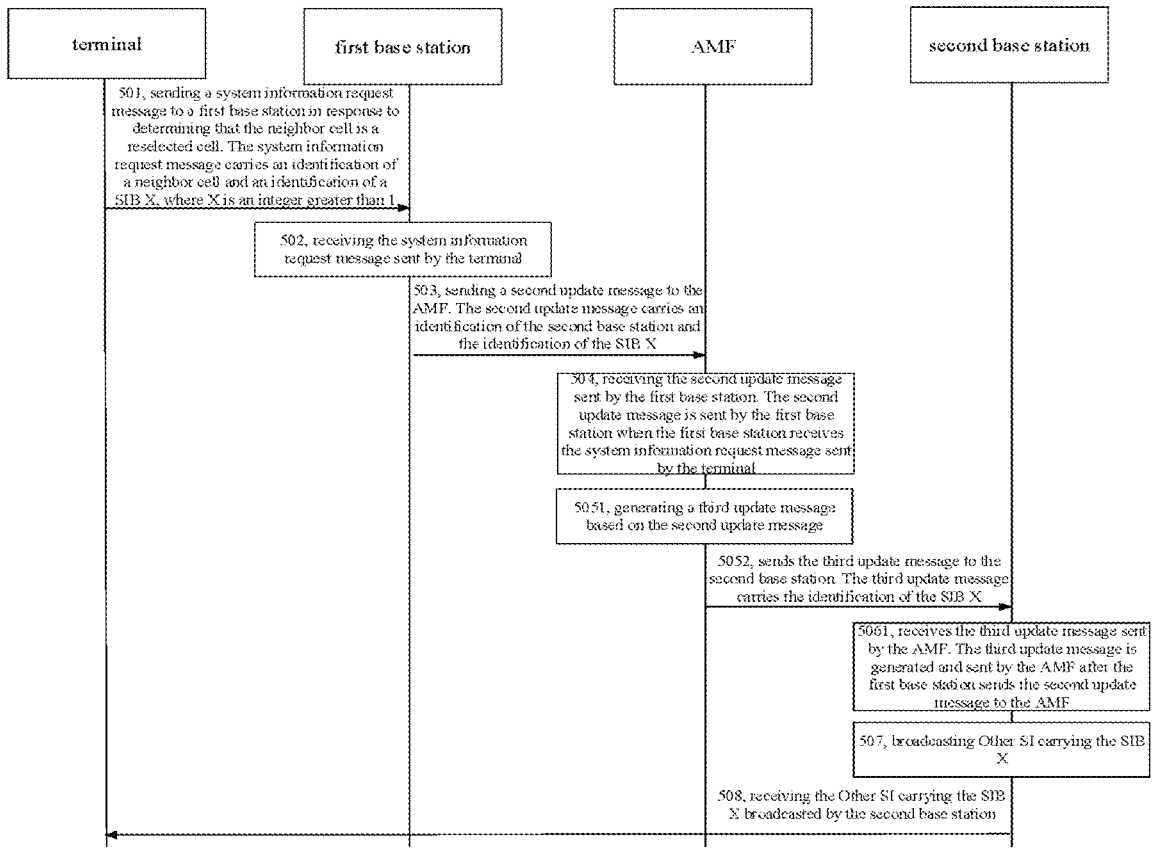
FIG. 7 is a flow chart illustrating a method for transmitting system information according to another exemplary embodiment of the present disclosure.

In an alternative embodiment based on FIG. 6, as illustrated in FIG. 7, the above steps 505 and 506 may be implemented instead as steps 5051 and 5061, and the alternative steps can be as follows.

At step 5051, the AMF generates a third update message based on the second update message.

At step 5052, the AMF sends the third update message to the second base station. The third update message carries the identification of the SIB X.

The AMF is configured to generate the third update message based on the second update message, and send the third update message to the second base station. After receiving the second update message, the AMF addresses the second base station according to the identification of the second base station. The AMF determines a location of the second base station based on an addressing result, and sends the third update message to the second based station. Alternatively, the third update message includes an access and mobility management function configuration update (AMF CONFIGURATION UPDATE) message.

At step 5061, the second base station receives the third update message sent by the AMF. The third update message is generated and sent by the AMF after the first base station sends the second update message to the AMF.

In conclusion, in the method provided by this embodiment, the system information request message is sent to the first access network device for the dwell cell by the UE, the first access network device receives the system information request message and sends the update message to the second access network device for the neighbor cell, the second access network device broadcasts the Other SI of the neighbor cell after receiving the update message, the Other SI carries the SIB X for configuring transmission resources. Thus, it is realized that the UE can read the SIB X of the neighbor cell in advance before performing cell reselection, thereby meeting the low latency requirement of the terminal when transmitting service data.

In the method provided by this embodiment, when there is no Xn interface between the first base station and the second base station, and there is no direct communication between the first base station and the second base station, the AMF may be used as the transfer network element to realize the message transfer between the first base station and the second base station. The AMF receives the second update message sent by the first base station, and generates the third update message. The AMF sends the third update message to the second base station. The second base station broadcasts the Other SI carrying the SIB X based on the third update message, so that the UE may obtain the Other SI carrying the SIB X.

The steps performed by the second base station may be individually implemented as a method for sending system information at an access network device side. The steps performed by the AMF may be individually implemented as a method for sending system information at a management element side.

The followings are device embodiments of the present disclosure, which may be used to implement the method embodiments of the present disclosure. For details that are not disclosed in the device embodiments of the present disclosure, reference may be made to the method embodiments of the present disclosure.

Figure 8:
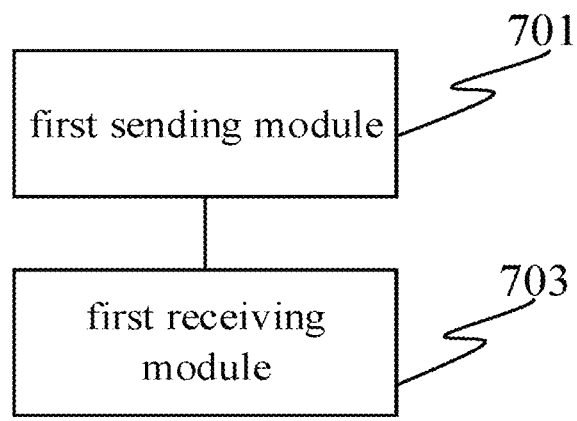
FIG. 8 is a structure diagram illustrating a terminal according to an exemplary embodiment of the present disclosure.

FIG. 8 illustrates a structure diagram of a terminal according to an exemplary embodiment of the present disclosure. In this embodiment, for example, a first access network device is a first base station for a cell where the terminal currently dwells, and a second access network device is a second base station for a neighbor cell. The terminal includes a first sending module 701 and a first receiving module 703. Of course, it should be understood that one or more of the modules described in this specification can be implemented by hardware, such as circuitry.

The first sending module 701 is configured to send a system information request message to the first base station. The system information request message carries an identification of the neighbor cell and an identification of a system information block (SIB) X, where X is an integer greater than 1.

The first receiving module 703 is configured to receive other system information (Other SI) broadcasted by the second base station. The Other SI carries the SIB X.

The Other SI at least includes the SIB X. After the UE request the SIB X, the based station may broadcast the Other SI including the SIB X based on a request of the UE. In addition, the base station may broadcast at least one SIB X of different Other SI according to the request of different UE. A specific form of the SIB X may be determined based on actual situation and is not limited herein.

The system information request message is configured to instruct the first base station to send an update message to the second base station. The update message carries the identification of the SIB X. Alternatively, the system information request message is carried in a msg 3 message during a random access procedure. Alternatively, the terminal sends the msg 3 during the random access procedure to the first base station. The msg 3 message carries the system information request message.

The SIB X carries radio resource configuration information of a specified service. The specified service is a service with a transmission latency requirement lower than a preset threshold, also called a low-latency service. For example, the specified service is a V2X service, the SIB X carries resource pool configuration information of the V2X service. The resource pool configuration information includes time and frequency ranges of radio resource used to send and/or receive V2X data. The SIB X is a SIB used to indicate a resource pool of the specified service specified by a communication protocol, and a serial number of the SIB X is fixed. That is, each cell uses the SIB X with the same serial number to provide the terminal with the resource pool configuration information of the specified service.

Alternatively, there are one or more identifications of neighbor cells. The identification of the neighbor cell includes a PCI, or the identification of the neighbor cell includes an ECGI.

Alternatively, when a cell broadcasts SIB 1, UE may receive an ECGI of a neighbor cell. When the UE establishes synchronization information with a cell, the UE may receive a PCI of a neighbor cell through the synchronization information.

In some possible implementations, the identification of the neighbor cell includes a physical cell identifier (PCI); or the identification of the neighbor cell includes an evolutionary-universal mobile communication system terrestrial radio access network cell global identification (ECGI).

The first sending module 701 is configured to send the system information request message to the first base station in response to determining that the neighbor cell is a reselected cell. Alternatively, the terminal sends the system information request message to the first base station before cell reselection is completed. The terminal sends the system information request message to the first base station when the terminal determines that the neighbor cell is a reselected cell (also called a target cell) during the cell reselection process.

Figure 9:
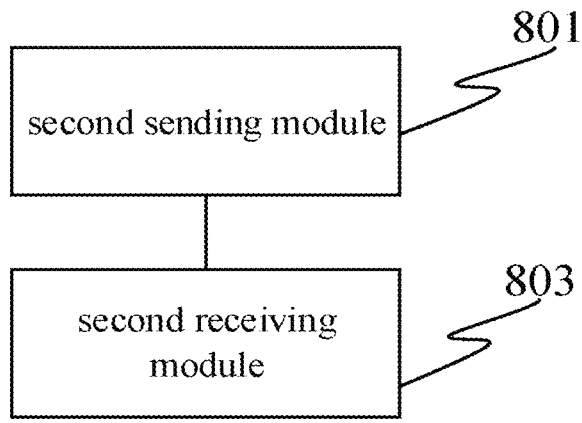
FIG. 9 is a structure diagram illustrating a first access network device according to an exemplary embodiment of the present disclosure.

FIG. 9 illustrates a structure diagram of a first access network device according to an exemplary embodiment of the present disclosure. In this embodiment, for example, the first access network device is a first base station for a cell where a terminal currently dwells, a second access network device is a second base station for a neighbor cell, and a management element is an AMF of the first base station and the second base station in a core network. The device includes a second sending module 801 and a second receiving module 803.

The second receiving module 803 is configured to receive a system information request message sent by the terminal. The system information request message carries an identification of the neighbor cell and an identification of a SIB X, where X is an integer greater than 1. In some possible implementations, the second receiving module 803 is configured to receive the msg 3 in the random access procedure sent by the terminal, and obtain the system information request message from the msg 3.

The second sending module 801 is configured to send an update message to a second base station. The update message carries the identification of the SIB X. The update message is configured to instruct the second base station to broadcast Other SI carrying the SIB X.

The Other SI at least includes the SIB X. After the UE request the SIB X, the base station may broadcast the Other SI carrying the SIB X based on the request of the UE. In addition, the base station may broadcast at least one SIB X of different Other SI according to the request of different UE. A specific form of the SIB X may be determined based on actual situation and is not limited herein.

Alternatively, the second sending module 801 is configured to send a first update message to the second base station through an Xn interface. The first update message carries the identification of the SIB X.

The second sending module 801 is configured to send a second update message to the AMF. The second update message carries an identification of the second base station and the identification of the SIB X. The AMF is configured to forward the second update message to the second base station or send a third update message carrying the identification of the SIB X to the second base station.

Alternatively, the first update message includes a NG-RAN NODE CONFIGURTION UPDATE message. The identification of the second base station includes a Global RAN Node ID and a TA ID. The second update message includes a RAN CONFIGURATION UPDATE message. The third update message includes an AMF CONFIGURATION UPDATE message.

Figure 10:
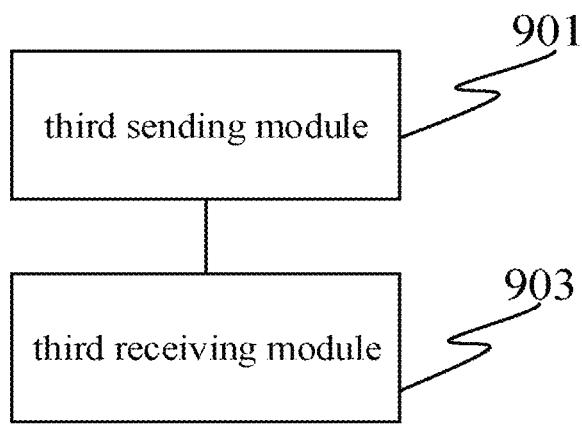
FIG. 10 is a structure diagram illustrating a second access network device according to an exemplary embodiment of the present disclosure.

FIG. 10 illustrates a structure diagram of a second access network device according to an exemplary embodiment of the present disclosure. In this embodiment, for example, a first access network device is a first base station for a cell where a terminal currently dwells, the second access network device is a second base station for a neighbor cell, and a management element is an AMF of the first base station and the second base station in a core network. The device includes a third sending module 901 and a third receiving module 903.

The third receiving module 903 is configured to receive an update message sent by a first base station. The update message carries an identification of a SIB X, where X is an integer greater than 1. The update message is sent by the first base station after receiving a system information request message sent by a terminal. Alternatively, the third receiving module 903 is configured to receive a first update message sent by the first base station through an Xn interface. The first update message carries the identification of the SIB X.

The third receiving module 903 is configured to receive a second update message sent by the AMF. The second update message is sent by the first base station to the AMF. The second update message carries the identification of the SIB X. Alternatively, the third receiving module 903 is configured to receive a third update message sent by the AMF. The third update message is generated and sent by the AMF after the first base station sends the second update message to the AMF. The third update message carries the identification of the SIB X.

Alternatively, the first update message includes a NG-RAN NODE CONFIGURATION UPDATE message. The second update message includes a RAN CONFIGURATION UPDATE message. The third update message includes an AMF CONFIGURATION UPDATE message.

The third sending module 901 is configured to broadcast Other SI carrying the SIB X.

Figure 11:
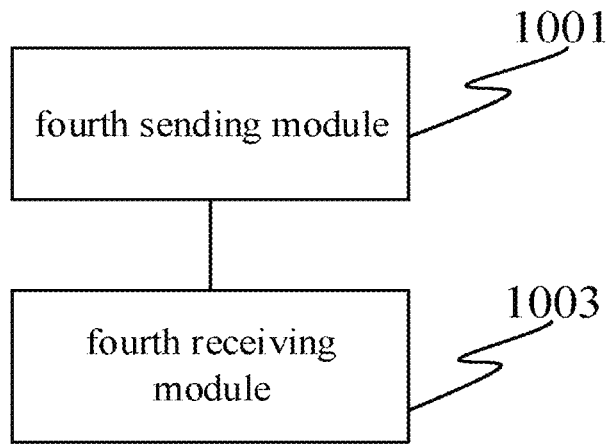
FIG. 11 is a structure diagram illustrating a management element according to an exemplary embodiment of the present disclosure.

FIG. 11 illustrates a structure diagram of a management element according to an exemplary embodiment of the present disclosure. In this embodiment, for example, a first access network device is a first base station for a cell where a terminal currently dwells, a second access network device is a second base station for a neighbor cell, and the management element is an AMF of the first base station and the second base station in a core network. The device includes a fourth sending module 1001 and a fourth receiving module 1003.

The fourth receiving module 1003 is configured to receive a second update message sent by a first base station. The second update message carries an identification of a SIB X. The second update message is sent by the first base station when receiving a system information request message sent by the terminal, where, X is an integer greater than 1.

Alternatively, the fourth sending module 1001 is configured to address the second base station according to an identification of the second base station, and send the second update message to the second base station based on an addressing result. Alternatively, the fourth sending module 1001 is configured to address the second base station according to the identification of the second base station, and send the third update message to the second base station based on an addressing result.

Alternatively, the second update message includes a RAN CONFIGURATION UPDATE message, the third update message includes an AMF CONFIGURATION UPDATE message.

The fourth sending module 1001 is configured to send the second update message. Alternatively, the fourth sending module 1001 is configured to generate a third update message based on the second update message and send the third update message to the second base station. The third update message carries the identification of the SIB X.

With respect to the devices in the above embodiments, the specific manners for performing operations for individual modules therein have been described in detail in the embodiments of the related method, which will not be elaborated herein.

In conclusion, in the method provided by this embodiment, the system information request message is sent to the first access network device for the dwell cell by the UE, the first access network device receives the system information request message and sends the update message to the second access network device for the neighbor cell, the second access network device broadcasts the Other SI of the neighbor cell after receiving the update message, the Other SI carries the SIB X for configuring transmission resources. Thus, it is realized that the UE can read the SIB X of the neighbor cell in advance before performing cell reselection, thereby meeting the low latency requirement of the terminal when transmitting service data.

In the device provided in an embodiment, there is an Xn interface between the first base station and the second base station, which realizes direct communication between the first base station and the second base station. The first base station may directly send the first update message to the second base station through the Xn interface, requesting the neighbor cell to broadcast the Other SI carrying the SIB X, so that the UE may obtain the Other SI carrying the SIB X.

In the device provided in an embodiment, when there is no Xn interface between the first base station and the second base station, and the first base station and the second base station cannot communicate directly, the AMF may be used as the transfer network element to realize the message transfer between the first base station and the second base station. The AMF forward the second update message sent from the first base station to the second base station. The second base station broadcasts the Other SI carrying the SIB X based on the second update message, so that the UE may obtain the Other SI carrying the SIB X. Alternatively, The AMF receives the second update message sent by the first base station, and generates the third update message. The AMF sends the third update message to the second base station. The second base station broadcasts the Other SI carrying the SIB X based on the third update message, so that the UE may obtain the Other SI carrying the SIB X.

It should be noted that the sending modules in the above embodiment may be implemented by a communication chip, or may be implemented by cooperation of a communication chip and a processor; and/or, the receiving modules in the above embodiment may be implemented by a communication chip, or may be implemented by cooperation of a communication chip and a processor.

Figure 12:
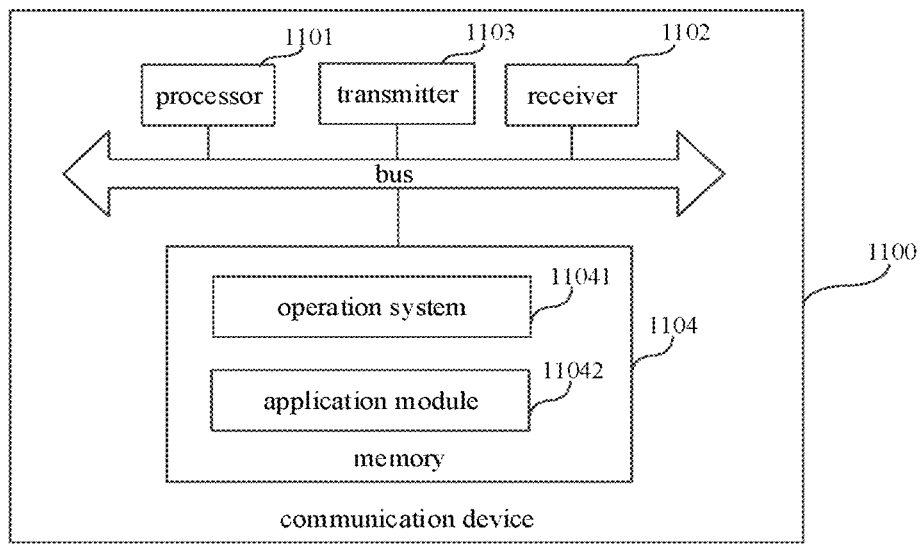
FIG. 12 is a block diagram illustrating a communication device according to an exemplary embodiment of the present disclosure.

FIG. 12 illustrates a block diagram of a communication device 1100 according to an exemplary embodiment of the present disclosure. For example, the communication device 1100 may be a terminal, a first access network device, a second access network device, or a management element. As illustrated in FIG. 12, the communication device 1100 may include a processor 1101, a receiver 1102, a transmitter 1103, and a memory 1104. The receiver 1102, the transmitter 1103, and the memory 1104 may be respectively connected to the processor 1101 via buses.

The processor 1101 includes one or more processing cores. The processor runs software programs and modules to implements the method executed by the terminal, the first access network device, the second access network device, or the management element in the method for transmitting system information provided by the embodiments of the present disclosure. The memory 1104 may be configured to store software programs and modules. In detail, the memory 1104 may store an operation system 11041 and an application module 11042 required by at least one function. The receiver 1102 is configured to receive communication data sent by other devices. The transmitter 1103 is configured to send communication data to other devices.

Figure 13:
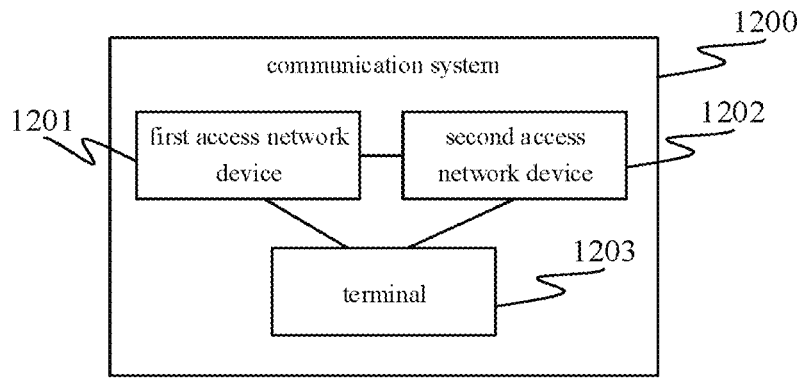
FIG. 13 is a block diagram illustrating a communication system according to an exemplary embodiment of the present disclosure.

FIG. 13 is a block diagram illustrating a communication system 1200 according to an exemplary embodiment of the present disclosure. As illustrated in FIG. 13, the communication system 1200 includes a first access network device 1201, a second access network device 1202, and a terminal 1203.

The first access network device 1201, a second access network device 1202, and a terminal 1203 are configured to implement the method for transmitting system information in the embodiment illustrated in FIG. 5.

Figure 14:
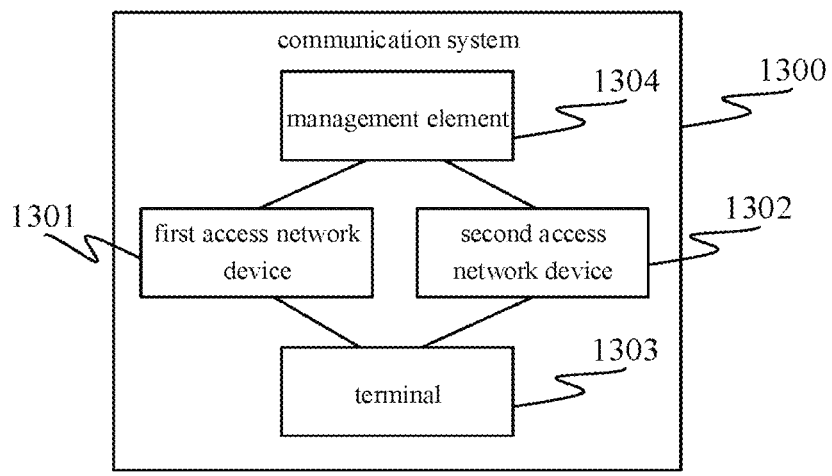
FIG. 14 is a block diagram illustrating a communication system according to another exemplary embodiment of the present disclosure.

FIG. 14 is a block diagram illustrating a communication system 1300 according to another exemplary embodiment of the present disclosure. As illustrated in FIG. 14, the communication system 1300 includes a first access network device 1301, a second access network device 1302, a terminal 1303, and a management element 1304.

The first access network device 1301, a second access network device 1302, a terminal 1303, and the management element 1304 are configured to implement the method for transmitting system information in the embodiment illustrated in FIG. 6.

In an exemplary embodiment, a computer readable storage medium is further provided. The computer readable storage medium is non-transitory computer readable storage medium. The computer readable storage medium has computer programs stored thereon that, when executed by a processing component, may realize the method for transmitting system information provided in the above embodiments of the present disclosure.

Embodiments of the present disclosure further provide a computer program product. The computer program product has instructions stored thereon that, when executed on a computer, cause the computer to be able to implement the method for transmitting system information provided in embodiments of the present disclosure.

Embodiments of the present disclosure further provide a chip. The chip includes programmable logic circuits and/or program instructions. When the chip operates, the method for transmitting system information provided in embodiments of the present disclosure is implemented.

It is understood that, "plurality" mentioned herein refers to two or more. and other quantifiers are similar. "And/or" describes a relation of the related objects, indicating three relations. For example, "A and/or B" indicates three conditions, i.e., A exists alone, A and B exist simultaneously, and B exists alone. The character "/" generally indicates that it is either the former related object or the latter related object.

Those skilled in the art easily think of other embodiments of the present disclosure after considering the description and practicing the present disclosure disclosed herein. This disclosure is intended to cover any variations, uses, or adaptive changes that follow the general principles of this disclosure and include common general knowledge or customary technical means in the technical field not disclosed in this disclosure. The description and examples are to be considered exemplary only, and the true scope and spirit of this disclosure are indicated by the claims.

It should be understood that the present disclosure is not limited to the precise structure that has been described above and shown in the drawings, and various modifications and changes can be made without departing from the scope thereof. The scope of the present disclosure is limited only by the appended claims.

What is claimed is:

1. A method for receiving system information that is applied to a terminal, the method comprising:
    sending a system information request message to a first access network device, the system information request message carrying an identification of a neighbor cell and an identification of a system information block (SIB) X, where X is an integer greater than 1;
    wherein the system information request message is configured to instruct the first access network device to send an update message to the second access network device, wherein the update message carries the identification of the SIB X; and
    receiving other system information (Other SI) broadcasted by a second access network device, the Other SI carrying the SIB X,
    wherein the first access network device is an access network device for a cell where the terminal currently dwells and the second access network device is an access network device for the neighbor cell;
    wherein sending the update message to the second access network device comprises: sending a second update message to a management element, the second update message carrying an identification of the second access network device and the identification of the SIB X, the management element being configured to forward the second update message to the second access network device or send a third update message carrying the identification of the SIB X to the second access network device.

2. The method of claim 1, wherein:
    the identification of the neighbor cell includes a physical cell identifier (PCI), or
    the identification of the neighbor cell includes an E-UTRAN cell global identification (EC GI).

3. The method of claim 1, wherein the system information request message to the first access network device further comprises:
    sending the system information request message to the first access network device when the neighbor cell is a reselected cell.

4. The method of claim 1, wherein the system information request message is carried in a msg 3 message during a random access procedure.

5. A terminal, comprising:
    a processor;
    a transceiver that is connected to the processor; and
    a memory for storing instructions executable by the processor,
    wherein the processor is configured to implement the method for receiving system information according to claim 1.

6. A method for sending system information that is applied to a first access network device, the method comprising:
    receiving a system information request message sent by a terminal, the system information request message carrying an identification of a neighbor cell and an identification of a system information block (SIB) X, where X is an integer greater than 1; and
    sending an update message to a second access network device, the update message carrying the identification of the SIB X and being configured to instruct the second access network device to broadcast other system information (Other SI) carrying the SIB X, wherein the first access network device is an access network device for a cell where the terminal currently dwells, and the second access network device is an access network device for the neighbor cell;
    wherein, sending the update message to the second access network device further comprises:
    sending a second update message to a management element, the second update message carrying an identification of the second access network device and the identification of the SIB X, the management element being configured to forward the second update message to the second access network device or send a third update message carrying the identification of the SIB X to the second access network device.

7. The method of claim 6, wherein sending the update message to the second access network device further comprises:
    sending a first update message to the second access network device through an Xn interface, the first update message carrying the identification of the SIB X.

8. The method of claim 7, wherein the first update message includes a next generation radio access network node configuration update (NG-RAN NODE CONFIGURATION UPDATE) message.

9. The method of claim 6, wherein, the identification of the second access network device comprises a global radio access network node identification (Global RAN Node ID) and a tracking area identification (TA ID).

10. The method of claim 6, wherein:
    the second update message includes a radio access network configuration update (RAN CONFIGURATION UPDATE) message; and
    the third update message includes an access and mobility management function configuration update (AMF CONFIGURATION UPDATE) message.

11. The method of claim 6, wherein the system information request message is carried in a msg 3 message during a random access procedure.

12. A first access network device, comprising:
a processor;
a transmitter and a receiver that are connected to the processor; and
a memory for storing instructions executable by the processor,
wherein the processor is configured to implement the method for sending system information according to claim 6.

13. A method for sending system information that is applied to a second access network device, the method comprising:
receiving an update message sent by a first access network device, the update message carrying an identification of a system information block (SIB) X, where X is an integer greater than 1, and the update message being sent by the first access network device after receiving a system information request message sent by a terminal; and
broadcasting other system information (Other SI) carrying the SIB X,
wherein the first access network device is an access network device for a cell where the terminal currently dwells, and the second access network device is an access network device for a neighbor cell of the cell where the terminal currently dwells;
wherein receiving the update message sent by the first access network device further comprises:
receiving a second update message sent by a management element, the second update message being sent by the first access network device to the management element, and the second update message carries the identification of the SIB X; or
receiving a third update message sent by the management element, the third update message being generated and sent by the management element after the first access network device sends the second update message to the management element, and the third update message carries the identification of the SIB X.

14. The method of claim 13, wherein, receiving the update message sent by the first access network device further comprises:
receiving a first update message sent by the first access network device through an Xn interface, the first update message carrying the identification of the SIB X.

15. The method of claim 14, wherein, the first update message comprises a next generation radio access network node configuration update (NG-RAN NODE CONFIGURATION UPDATE) message.

16. The method of claim 13, wherein:
the second update message includes a radio access network configuration update (RAN CONFIGURATION UPDATE) message; and
the third update message includes an access and mobility management function configuration update (AMF CONFIGURATION UPDATE) message.

17. A second access network device, comprising:
a processor;
a transmitter and a receiver that are connected to the processor; and
a memory for storing instructions executable by the processor,
wherein the processor is configured to implement the method for sending system information according to claim 13.

* * * * *